US008433351B2

(12) United States Patent
Abedi

(10) Patent No.: US 8,433,351 B2
(45) Date of Patent: Apr. 30, 2013

(54) COMMUNICATIONS SYSTEMS

(75) Inventor: Saied Abedi, Reading (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/434,325

(22) Filed: Mar. 29, 2012

(65) Prior Publication Data
US 2012/0184310 A1 Jul. 19, 2012

Related U.S. Application Data

(62) Division of application No. 12/320,049, filed on Jan. 15, 2009, now abandoned.

(30) Foreign Application Priority Data

Jan. 28, 2008 (GB) .................................. 0801535.6

(51) Int. Cl.
*H04B 15/00* (2006.01)
(52) U.S. Cl.
USPC ......... 455/501; 455/452.2; 455/509; 370/338
(58) Field of Classification Search .................. 455/509, 455/501, 452.2; 370/338
See application file for complete search history.

(56) References Cited

U.S. PATENT DOCUMENTS

| 5,859,841 | A * | 1/1999 | Gitlits ............................ 370/335 |
| 5,926,763 | A * | 7/1999 | Greene et al. ................. 455/450 |
| 6,647,002 | B1 | 11/2003 | Suda et al. |
| 6,792,274 | B1 * | 9/2004 | Kapanen ........................ 455/450 |
| 6,804,267 | B1 * | 10/2004 | Long et al. .................... 370/524 |
| 6,819,875 | B2 | 11/2004 | Touma |
| RE38,787 | E * | 8/2005 | Sainton et al. ................ 455/453 |
| 7,099,595 | B2 | 8/2006 | Touma |
| 7,436,788 | B2 * | 10/2008 | Huschke et al. .............. 370/310 |
| 7,499,964 | B2 * | 3/2009 | Busch et al. .................. 709/200 |
| 7,558,348 | B1 * | 7/2009 | Liu et al. ....................... 375/346 |
| 7,792,533 | B2 | 9/2010 | Grandblaise et al. |

(Continued)

FOREIGN PATENT DOCUMENTS

| EP | 1220557 A1 | 7/2002 |
| EP | 1257092 | 11/2002 |

(Continued)

OTHER PUBLICATIONS

Extended European Search Report dated Sep. 15, 2009 received in corresponding European patent application No. 08172984.0-2412/2083593.

(Continued)

*Primary Examiner* — Hai Nguyen
(74) *Attorney, Agent, or Firm* — Smith, Gambrell & Russell, LLP

(57) ABSTRACT

A method of controlling spectrum use in a first wireless communications system, the first wireless communications system being operable to take part in a spectrum assignment process involving at least the first wireless communications system and one or more other wireless communications systems, the method comprising in a single instance of the spectrum assignment process, exchanging a first portion of spectrum for a second, different portion of spectrum, by assigning the first portion of spectrum from the first wireless communications system to the one or more other wireless communications systems and accepting the assignment of the second portion of spectrum from the one or more other wireless communications systems to the first wireless communications system.

13 Claims, 10 Drawing Sheets

U.S. PATENT DOCUMENTS

| | | | |
|---|---|---|---|
| 8,023,956 B2 * | 9/2011 | Hu | 455/452.1 |
| 8,116,687 B2 * | 2/2012 | Patel et al. | 455/63.1 |
| 8,150,955 B2 * | 4/2012 | Busch et al. | 709/223 |
| 8,238,301 B2 * | 8/2012 | Qu et al. | 370/329 |
| 2002/0052914 A1 * | 5/2002 | Zalewski et al. | 709/203 |
| 2002/0137518 A1 * | 9/2002 | Achour | 455/447 |
| 2002/0176437 A1 | 11/2002 | Busch et al. | |
| 2002/0181462 A1 * | 12/2002 | Surdila et al. | 370/392 |
| 2004/0166835 A1 * | 8/2004 | Johansson et al. | 455/414.1 |
| 2005/0128971 A1 * | 6/2005 | Huschke et al. | 370/328 |
| 2005/0221795 A1 * | 10/2005 | Hirabe et al. | 455/409 |
| 2005/0260997 A1 * | 11/2005 | Korale et al. | 455/452.2 |
| 2006/0083205 A1 * | 4/2006 | Buddhikot et al. | 370/338 |
| 2007/0008927 A1 * | 1/2007 | Herz et al. | 370/331 |
| 2007/0054683 A1 | 3/2007 | Hansen et al. | |
| 2007/0117537 A1 | 5/2007 | Hui | |
| 2007/0178840 A1 | 8/2007 | Deguchi | |
| 2008/0019423 A1 * | 1/2008 | Hu | 375/141 |
| 2008/0069079 A1 * | 3/2008 | Jacobs | 370/348 |
| 2008/0113622 A1 | 5/2008 | Lee et al. | |
| 2008/0153419 A1 | 6/2008 | Buris et al. | |
| 2008/0214200 A1 | 9/2008 | Grandblaise et al. | |
| 2008/0317062 A1 | 12/2008 | Timmers et al. | |
| 2009/0053999 A1 | 2/2009 | Shoemake et al. | |
| 2009/0161614 A1 | 6/2009 | Grandblaise et al. | |
| 2009/0304047 A1 * | 12/2009 | Hulbert et al. | 375/144 |
| 2010/0009710 A1 | 1/2010 | Zhang et al. | |
| 2012/0149420 A1 * | 6/2012 | Naden et al. | 455/517 |

FOREIGN PATENT DOCUMENTS

| | | |
|---|---|---|
| EP | 1742497 | 1/2007 |
| EP | 1853077 | 11/2007 |
| EP | 1883258 A1 | 1/2008 |
| JP | H09510333 A | 10/1997 |
| JP | 2003032268 A | 1/2003 |
| WO | 03071823 A1 | 8/2003 |
| WO | 2007005181 A3 | 1/2007 |
| WO | 2007005182 A2 | 1/2007 |

OTHER PUBLICATIONS

Search Report issued in the Priority Application No. GB0801535.6 dated May 28, 2008.

Non-Final Office Action dated Aug. 26, 2011 received in Application No. 12/320,049.

Japanese Office Action Notification of Reasons for Refusal dated Jul. 24, 2012, received in JP Patent Application No. 2009-015917.

* cited by examiner

COMMUNICATIONS SYSTEMS

CROSS-REFERENCE TO RELATED APPLICATIONS

This application is a divisional of application Ser. No. 12/320,049, filed on Jan. 1, 2009, now pending.

BACKGROUND OF THE INVENTION

1. Field of the Invention

The invention relates to a method of, and apparatus for, controlling spectrum use in a wireless communications system.

2. Description of the Related Art

Recent studies worldwide indicate that while some systems and mobile operators are in desperate need for more efficient utilization of spectrum resources, most of the radio spectrum resources remain underutilized or unused most of the time. The increasing demand for flexible use of the radio spectrum for emerging new services and applications is the motivation behind numerous research activities worldwide. Efficient access to radio spectrum resources will generate new sources of revenues for worldwide vendors and wireless network operators.

Four different levels of spectrum management techniques have been introduced in three different time scales: Spectrum Sharing and Coexistence (couple of hours or days), Long Term Spectrum Assignment (couple of minutes), Short Term Spectrum Assignment (1 sec or tens of ms) and fast dynamic spectrum allocation (10 ms time scale or even below).

However, due to the heavy traffic load, multiple negotiating parties involved in a Short Term Spectrum Assignment process might not be able to provide free spectrum to other parties, for the simple reason that they themselves require the spectrum.

SUMMARY OF THE INVENTION

According to a first aspect, there is provided a method of controlling spectrum use in a first wireless communications system, the first wireless communications system being operable to take part in a spectrum assignment process involving at least the first wireless communications system and one or more other wireless communications systems, the method comprising
in a single instance of the spectrum assignment process, exchanging a first portion of spectrum for a second, different portion of spectrum, by assigning the first portion of spectrum from the first wireless communications system to the one or more other wireless communications systems and accepting the assignment of the second portion of spectrum from the one or more other wireless communications systems to the first wireless communications system.

The method may provide for a different type of spectrum exchange process under which the parties involved do not lose spectrum to other parties, and instead exchange a sub-chunk of spectrum (which is troubled in terms of the currently inflicted interference or which has been troubled in terms of interference, say for the past couple of transmission attempts) with a better sub-chunk of spectrum in terms of the interference they suffer.

The invention may improve the spectral efficiency by exploiting the availability of spectrum on a short-term basis based on cluster-wise negotiations. It may provide a further fine tuning to long-term spectrum assignment (when performed as a short-term spectrum assignment) and to short-term spectrum assignment, improving the QoS and SIR ratio, the overall network coverage, throughput, and the revenue for the borrowing party by making sure that the radio resource is available when needed at peak times. An extra source of income for operators as the lending party may be provided by making sure that the redundant radio spectrum is not wasted and employed in an efficient way. The method may reduce the potential call blockage by providing better and more efficient access to more radio resources.

The term "wireless communications system" may relate to a wireless access network, for example a radio access network (RAN), including all of the elements of the network, for example base stations. The radio access network may be a metropolitan-area network or a wide-area network, for example. In another arrangement, it may relate to an RFID tag reader, to a sink or wireless sensor network base station, or to a group of such readers forming a network, possibly including other equipment, e.g. control circuitry. It may also relate to a WiMAX network. A wireless communications system may be a macro network or a micro network.

A spectrum assignment may comprise the re-assignment of at least a portion of a spectrum band which has been pre-assigned to one wireless communications system from that wireless communications system to another wireless communications system. In other words, where a first spectrum band has been pre-assigned to a first wireless communications system, and a second spectrum band has been pre-assigned to a second wireless communications system, the spectrum assignment process may comprise (for example during negotiations between the first and second wireless communications systems) re-assigning, from one of the first and second wireless communications systems to the other of the first and second wireless communications systems, some or all of the respective first or second pre-assigned spectrum band. By "pre-assigned" it may be meant that the wireless communications system to which the spectrum band has been pre-assigned is licensed for operation within that spectrum band. The act of assigning a portion of spectrum from one system to another may comprise the one system giving permission to the other system to use the assigned portion of spectrum, whereafter the one system ceases to operate using the assigned portion, while the other system may choose to operate using the assigned portion if desired. The spectrum assignment process may relate in particular to a short-term spectrum assignment process (1 sec or 10 s of milliseconds timescale) forming part of a larger spectrum sharing scheme further including at least a long-term spectrum assignment process. The spectrum assignment process may involve at least three wireless communications systems including the first and the other wireless communications systems. The term "instance" when used in relation to the spectrum assignment process may refer to a single run of the spectrum assignment process, i.e. spectrum use (including a spectrum configuration) may change only once during the process. A wireless communications system which assigns spectrum to another system may be referred to as an assignor, whereas a system which accepts the assignment of spectrum from another system may be referred to as an assignee.

By "spectrum" there may be meant radio frequencies or any other range of frequencies of electromagnetic radiation suitable for communication. For example, the first and second wireless communications systems may be radio access networks (RANs) operating within the radio frequency range of the electromagnetic spectrum. Additionally or alternatively, the wireless communications systems may operate within a microwave frequency range, for example.

The terms "portion" or "band" when used in relation to spectrum may relate to a particular range of frequencies, which may consist of a single, continuous range of frequencies, or two or more separate, continuous ranges. The terms "chunk" and "sub-chunk" may also refer to portions or bands of spectrum.

The term "spectrum configuration" may relate to an arrangement of one or more portions of spectrum, and may specify one or both of the amount of spectrum in each portion and/or its position in relation to other portions of spectrum in the spectrum configuration. For example, by defining each portion of spectrum with reference to its upper and lower limits, it is possible to indicate both the size of the portion and its position in relation to other portions of spectrum. A portion of spectrum may also be identified by reference to its size and/or a spectrum ID. A spectrum ID may be a number assigned to each sub-chunk, selected from a range of possibilities. The arrangement whereby sub-chunks are given spectrum IDs may be decided before or during the spectrum assignment process. A spectrum configuration may comprise one or more guard bands, and one or more regions of licensed/unlicensed spectrum. In addition, the spectrum configuration may comprise information which associates each portion of spectrum with a respective entity, which may be a wireless communications system (e.g. a radio access network) or part thereof, a cell or base station or a group of cluster thereof, or an uplink or downlink belonging to any such entity.

Preferably, the method may comprise performing the exchange, i.e. completing both the assignments from and to the first wireless communications system, in the same instance of the spectrum assignment process, before operating the first wireless communications system to use the new (altered) spectrum configuration.

The first wireless communications system and one or more of the other wireless communications systems may form part of a hierarchical overlaid cellular network. Additionally or alternatively, the first wireless communications system may have substantially no geographical overlap with the other wireless communications systems.

Any number of wireless communications systems may be involved in the exchange, with portions of spectrum being exchanged for example in a reciprocal fashion (between two systems) or in a circular fashion (between three or more systems) in order to benefit one or more, and preferably all, of the systems. For example, in a reciprocal exchange, the method may comprise assigning the first portion of spectrum from the first wireless communications system to a second wireless communications system amongst the one or more other wireless communications systems, and accepting the assignment of the second portion of spectrum from the second wireless communications system to the first wireless communications system. Alternatively, the method may comprise assigning the first portion of spectrum from the first wireless communications system to a second wireless communications system amongst the one or more other wireless communications systems, and accepting the assignment of the second portion of spectrum from a third wireless communications system amongst the one or more other wireless communications systems to the first wireless communications system, the second and third wireless communications systems being different. Thus, a two-way, three-way, four-way (or more) exchange may be provided. Additionally, one system may act as a relay or broker between two or more other systems.

The first and second portions of spectrum comprise any chunks of spectrum the exchange of which benefits one or more of the wireless communications systems, and preferably all of the systems. The benefit of the exchange to the wireless communications systems may take any appropriate form, including reduced levels of interference. In this regard, the method may comprise selecting one or both of the first and second portions of spectrum to reduce a level of interference in at least one of the first wireless communications system and the other wireless communications systems, based on levels of interference in the first and second portions. Preferably, the selection is made to reduce a level of interference in all of the wireless communications systems involved in the exchange. The selection may be done by the first wireless communications system, one or more of the other wireless communications systems, or by an external controller. The levels of interference may be measured, estimated or expected levels of interference.

To promote a fair exchange, in one arrangement, the method comprises controlling one or both of the first and second portions to substantially equalize operational parameters of the first wireless communications system with equivalent operational parameters of the second wireless communications system. The operational parameters may include any one or more of the size of the first or second portion of spectrum, a level of interference in the respective wireless communications system, the amount of a reduction in a level of such interference, the bandwidth of a channel belonging to the respective wireless communications system, the bit rate capacity of such a channel, a range of frequencies of the first or second portion of spectrum, or a change in data throughput capacity. In particular, in one arrangement, the first portion of spectrum may be substantially equal in size to the second portion of spectrum. However, even if it is not possible for some systems to have exactly equal sizes of exchanged portions of spectrum, it may be possible to have similar ones in terms of size. Each system may exchange a bad chunk of spectrum with a better chunk of spectrum, in terms of the interference being inflicted, although the exchanged values might not be exactly the same in some cases.

The method may comprise, before the exchange, identifying a high-interference portion of spectrum (i.e. a 'red' chunk) to serve as the first portion of spectrum. In this regard, the method may comprise analysing interference levels in each of a plurality of sub-chunks of spectrum used by the first wireless communications system before the exchange, and identifying the high-interference portion of spectrum by selecting a said sub-chunk associated with a level of interference which is higher than levels of interference associated with other said sub-chunks. By "associated with" there may be meant a current level of interference, a recent level of interference (for example in terms of interference for the past couple of transmissions, e.g. a level of interference which has been above a threshold for the last couple of transmissions), a running average of the level of interference, or any other appropriate measure.

The method may involve a simultaneous exchange of more than one portion of spectrum between (e.g. first and second) systems. Multiple sub-chunks of spectrum may be exchanged for example on a fair basis that would improve the performance of the systems involved to a certain level.

Analysing the interference levels may comprise each of a plurality of network elements of the first wireless communications system analysing the interference levels in each of a plurality of sub-chunks of the spectrum used by the first wireless communications system before the exchange, and each of the network elements identifying a said sub-chunk associated with a level of interference which is higher than levels of interference associated with other said sub-chunks.

In this case, identifying the high-interference portion of spectrum may comprise, in the case that the network elements all identify the same sub-chunk, selecting that sub-chunk as the high-interference portion, and, in the case that the network elements identify different sub-chunks, determining a region of spectrum which has the greatest degree of overlap with all of the different sub-chunks and selecting that region as the high-interference portion.

The method may comprise transmitting outgoing signalling specifying the first portion of spectrum as an exchange candidate, the signalling being transmitted for example to one or more of the other wireless communications systems (e.g. the one assigning spectrum to, or accepting spectrum from, the first wireless communications system) or to an external controller. Transmitting the outgoing signalling may comprise transmitting an exchange request specifying the first portion of spectrum as an exchange candidate in order to trigger the instance of the spectrum assignment process. The outgoing signalling may be transmitted from time to time, e.g. periodically, or in response to unusually high interference levels or traffic loads. The exchange request may request the exchange of the first portion of spectrum for unspecified portion, or it may specify a particular portion of spectrum in which an expected level of interference is low. Alternatively, the method may comprise transmitting the outgoing signalling following the receipt of an exchange request specifying the second portion of spectrum as an exchange candidate.

The method may comprise receiving incoming signalling specifying the second portion of spectrum as an exchange candidate. The incoming signalling may be received from the one or more wireless communications systems or from an external controller, for example. Receiving the incoming signalling may comprise receiving an exchange request specifying the second portion of spectrum as an exchange candidate in order to trigger the instance of the spectrum assignment process. The exchange request may request the exchange of the second portion for an unspecified portion, or a portion of spectrum in which an expected level of interference is low. Alternatively, the method may comprise receiving the incoming signalling following the transmission of an exchange request specifying the first portion of spectrum as an exchange candidate.

The method may comprise comparing the first and second portions of spectrum before the exchange, and proceeding (for example with the exchange, or with any of the steps following the comparison and prior to the exchange) only if the first portion of spectrum is different to the second portion of spectrum. By "different" there may be meant that the portions occupy completely separate frequency ranges, or that the frequency ranges partially overlap, i.e. the portions are completely or partially different, with one portion including a range of frequencies not present in the other portion. (In the case that the systems are located sufficiently far from one another that the interference from one system does not have a major impact on the other system.)

The method may comprise, before the exchange, analysing an expected level of interference associated with the second portion of spectrum, in order to determine its suitability as an exchange candidate.

It may be assumed that base stations have the capability to measure/predict/estimate the interference that they inflict on other base stations (and/or generally on the cells of those base stations) for each possible spectrum assignment, and are also capable of determining/measuring/estimating (or obtaining relevant information regarding) the interference received from such other base stations (and/or from the cells of those other base stations) for each such spectrum assignment.

Radio transmissions occupying the same frequency allocations (i.e. the same parts of the shared communication spectrum) can interfere with one another. The level of interference will depend on a number of factors, for example on the power levels of the respective transmissions, and on the relative locations of the transmitters. In fact, many factors have impact on interference. Considering a mobile telecommunications system comprising base stations as an example, these factors include antenna orientation in the base stations, transmission schemes employed (say FDD or TDD) by the base stations, the nature of sectorisation within the cells of the base stations, the power control schemes employed, the handover schemes employed, the nature of traffic being handled by the base stations at each point in time, and the number of active subscribers (e.g. mobile stations) assigned to each base station at each point in time. The smart antenna scheme employed in the base stations may also affect interference. Considering the impact of transmission power on interference, it is possible that a base station may be assigned a number of separate spectrum sub-chunks or sub-bands and that it may use different transmission power levels per sub-chunk. These different power levels can affect interference. Another important factor is the interference leakage between two adjacent sub-bands. Although in telecommunications systems the practical solution is to introduce guard bands to reduce such leakage, the arrangements of sub-bands assigned to a base station can nevertheless affect interference. Other important factors regarding interference may be, for example, surrounding atmospheric conditions and the presence or absence of obstructions to signal propagation. The effect of interference can be signal degradation and an overall drop in system performance as a whole, as compared to that in an "interference-free" system.

Analysing the expected level of interference associated with the second portion of spectrum may comprise each of a plurality of network elements of the first wireless communications system analysing the expected level of interference associated with the second portion of spectrum (and may comprise the network elements reporting to an apparatus which performs the remainder of the method, for example a lead network element of the first wireless communications system, or an external controller).

In order to determine the suitability of the second portion of spectrum as an exchange candidate, the method may comprise comparing the expected level of interference associated with the second portion of spectrum with a level of interference associated with the first portion of spectrum. Furthermore, the method may comprise transmitting confirmatory signalling to request or confirm the exchange of the first portion of spectrum for the second portion of spectrum, if the result of the comparison shows that the expected level of interference associated with the second portion of spectrum is lower than the level of interference associated with the first portion of spectrum. The method may comprise receiving confirmation of the exchange from one or more of the other wireless communications systems of from an external controller before performing the exchange.

As a final step, the method may comprise, following the exchange, operating the first wireless communications system to use the second portion of spectrum and to avoid using the first portion of spectrum (to the extent that the first and second portions do not overlap).

The method may comprise selecting one or both of the first and second portions of spectrum to reduce the number of separate, continuous regions of spectrum used by at least one of the first wireless communications system and the other wireless communications systems, in order to improve the layout of a spectrum configuration and potentially to reduce leakage.

The method of the first aspect may be performed by the first wireless communications system, an external controller, or both, for example.

According to a second aspect, there is provided apparatus for controlling spectrum use in a first wireless communications system, the first wireless communications system being operable to take part in a spectrum assignment process involving at least the first wireless communications system and one or more other wireless communications systems, the apparatus comprising spectrum assignment circuitry configured to exchange a first portion of spectrum for a second, different portion of spectrum, in a single instance of the spectrum assignment process, by assigning the first portion of spectrum from the first wireless communications system to the one or more other wireless communications systems and accepting the assignment of the second portion of spectrum from the one or more other wireless communications systems to the first wireless communications system.

The spectrum assignment circuitry may be configured to control one or both of the first and second portions to substantially equalize operational parameters of the first wireless communications system with equivalent operational parameters of the second wireless communications system.

The spectrum assignment circuitry may be configured to select one or both of the first and second portions of spectrum to reduce a level of interference in at least one of the first wireless communications system and the other wireless communications systems, based on levels of interference in the first and second portions.

The spectrum assignment circuitry may be configured to assign the first portion of spectrum from the first wireless communications system to a second wireless communications system amongst the one or more other wireless communications systems, and to accept the assignment of the second portion of spectrum from the second wireless communications system to the first wireless communications system. Alternatively, the spectrum assignment circuitry may be configured to assign the first portion of spectrum from the first wireless communications system to a second wireless communications system amongst the one or more other wireless communications systems, and to accept the assignment of the second portion of spectrum from a third wireless communications system amongst the one or more other wireless communications systems to the first wireless communications system, the second and third wireless communications systems being different.

The spectrum assignment circuitry may be configured to identify a high-interference portion of spectrum to serve as the first portion of spectrum. The spectrum assignment circuitry may be configured to analyse interference levels in each of a plurality of sub-chunks of spectrum used by the first wireless communications system before the exchange, and to identify the high-interference portion of spectrum by selecting a said sub-chunk associated with a level of interference which is higher than levels of interference associated with other said sub-chunks.

Each of a plurality of network elements of the first wireless communications system may be configured to analyse the interference levels in each of a plurality of sub-chunks of the spectrum used by the first wireless communications system before the exchange, and to identify a said sub-chunk associated with a level of interference which is higher than levels of interference associated with other said sub-chunks. In this regard, the spectrum assignment circuitry may be configured to receive signalling from each of the network elements indicating the respective sub-chunk. The spectrum assignment circuitry may be configured to identify the high-interference portion of spectrum, in the case that the network elements all identify the same sub-chunk, by selecting that sub-chunk as the high-interference portion, and, in the case that the network elements identify different sub-chunks, by determining a region of spectrum which has the greatest degree of overlap with all of the different sub-chunks and selecting that region as the high-interference portion. The spectrum assignment circuitry may be configured to compare and analyse the sub-chunks in order to identify the high-interference portion.

The spectrum assignment circuitry may be configured to transmit outgoing signalling specifying the first portion of spectrum as an exchange candidate. The spectrum assignment circuitry may be configured to transmit an exchange request specifying the first portion of spectrum as an exchange candidate in order to trigger the instance of the spectrum assignment process. The spectrum assignment circuitry may be configured to transmit the outgoing signalling following the receipt of an exchange request specifying the second portion of spectrum as an exchange candidate.

The spectrum assignment circuitry may be configured to receive incoming signalling specifying the second portion of spectrum as an exchange candidate. The spectrum assignment circuitry is configured to receive an exchange request specifying the second portion of spectrum as an exchange candidate in order to trigger the instance of the spectrum assignment process. The spectrum assignment circuitry may be configured to receive the incoming signalling following the transmission of an exchange request specifying the first portion of spectrum as an exchange candidate.

The spectrum assignment circuitry may be configured to compare the first and second portions of spectrum before the exchange, and to proceed only if the first portion of spectrum is different to the second portion of spectrum.

The spectrum assignment circuitry may be configured to analyse an expected level of interference associated with the second portion of spectrum.

Each of a plurality of network elements of the first wireless communications system may be configured to analyse the expected level of interference associated with the second portion of spectrum. In this regard, the spectrum assignment circuitry may be configured to receive signalling indicating the expected levels of interference from each of the network elements.

The spectrum assignment circuitry may be configured to compare the expected level of interference associated with the second portion of spectrum with a level of interference associated with the first portion of spectrum.

The spectrum assignment circuitry may be configured to transmit confirmatory signalling to request or confirm the exchange of the first portion of spectrum for the second portion of spectrum in response to the result of the comparison showing that the expected level of interference associated with the second portion of spectrum is lower than the level of interference associated with the first portion of spectrum.

The spectrum assignment circuitry may be configured to operate the first wireless communications system to use the second portion of spectrum and to avoid using the first portion of spectrum.

The spectrum assignment circuitry may be configured to select one or both of the first and second portions of spectrum to reduce the number of separate, continuous regions of spectrum used by at least one of the first wireless communications system and the other wireless communications systems.

The apparatus of the second aspect may be located at one or more of the network elements of the first wireless communications system or at another part of that system, or at an external controller, for example.

According to a third aspect, there is provided a computer program which, when run on a computer (perhaps forming part of a network element or an external controlling element), causes the computer to perform the method of the first aspect.

According to a fourth aspect, there is provided a computer program which, when loaded into a computer (perhaps forming part of a network element or an external controlling element), causes the computer to become the apparatus of the second aspect.

According to a fifth aspect, there is provided a computer program of the third or fourth aspect, carried by a carrier medium, which may be a recording medium and/or a transmission medium.

According to a sixth aspect, there is provided a computer program which, when run on a computer, causes the computer to perform a method of controlling spectrum use in a first wireless communications system, the first wireless communications system being operable to take part in a spectrum assignment process involving at least the first wireless communications system and one or more other wireless communications systems, the method comprising in a single instance of the spectrum assignment process, exchanging a first portion of spectrum for a second, different portion of spectrum, by assigning the first portion of spectrum from the first wireless communications system to the one or more other wireless communications systems and accepting the assignment of the second portion of spectrum from the one or more other wireless communications systems to the first wireless communications system.

According to a seventh aspect, there is provided a computer program for controlling spectrum use in a first wireless communications system, the first wireless communications system being operable to take part in a spectrum assignment process involving at least the first wireless communications system and one or more other wireless communications systems, the computer program comprising spectrum assignment code configured to exchange a first portion of spectrum for a second, different portion of spectrum, in a single instance of the spectrum assignment process, by assigning the first portion of spectrum from the first wireless communications system to the one or more other wireless communications systems and accepting the assignment of the second portion of spectrum from the one or more other wireless communications systems to the first wireless communications system.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which.

DETAILED DESCRIPTION

Embodiments of the invention relate to methods for short-term spectrum exchange in wireless networks.

FIGS. 1 to 6 relate to the exchange of spectrum between a base station BS1 of a cell WA1 of a wide-area network (WAN) and three cells MA1-3 of a metropolitan-area network (MAN), grouped as a cluster located within the WA cell WA1. The cell MA1 acts as a leader of the cluster of MA cells MA1-3.

The following steps describe a short-term spectrum exchange process.

In step 1, the spectrum is divided into sub-chunks. On a short-term basis, the base station BS1 of cell WA1 measures the interference in different sub-chunks of spectrum, as shown in the spectrum diagrams to the right-hand side of FIG. 2, in which the sub-chunk being analysed is shown in dark. Sub-chunks are preferably completely separate, but may partially overlap, as shown. If the interference is above a specific threshold, the base station BS1 identifies the specific sub-chunk of spectrum as 'red' or high temperature, as shown in the spectrum diagram at the top of FIG. 1, in which the arrow indicates the 'red' sub-chunk. In that case, the base station BS1 signals the leader base station in cell MA1 a trigger for the exchange of the high temperature sub-chunk of spectrum with a low interference sub-chunk of spectrum from the MAN, if available. Within the trigger, the exact ID of the specific red spectrum chunk is sent to the base station of cell MA1. The red spectrum sub-chunk can be a sub-chunk which has been troubled in terms of interference for the past couple of transmissions (e.g. the total interference has been above a threshold for the past couple of transmissions). Alternatively, it can be a sub-chunk which is currently experiencing a high level of interference.

Figure 1:
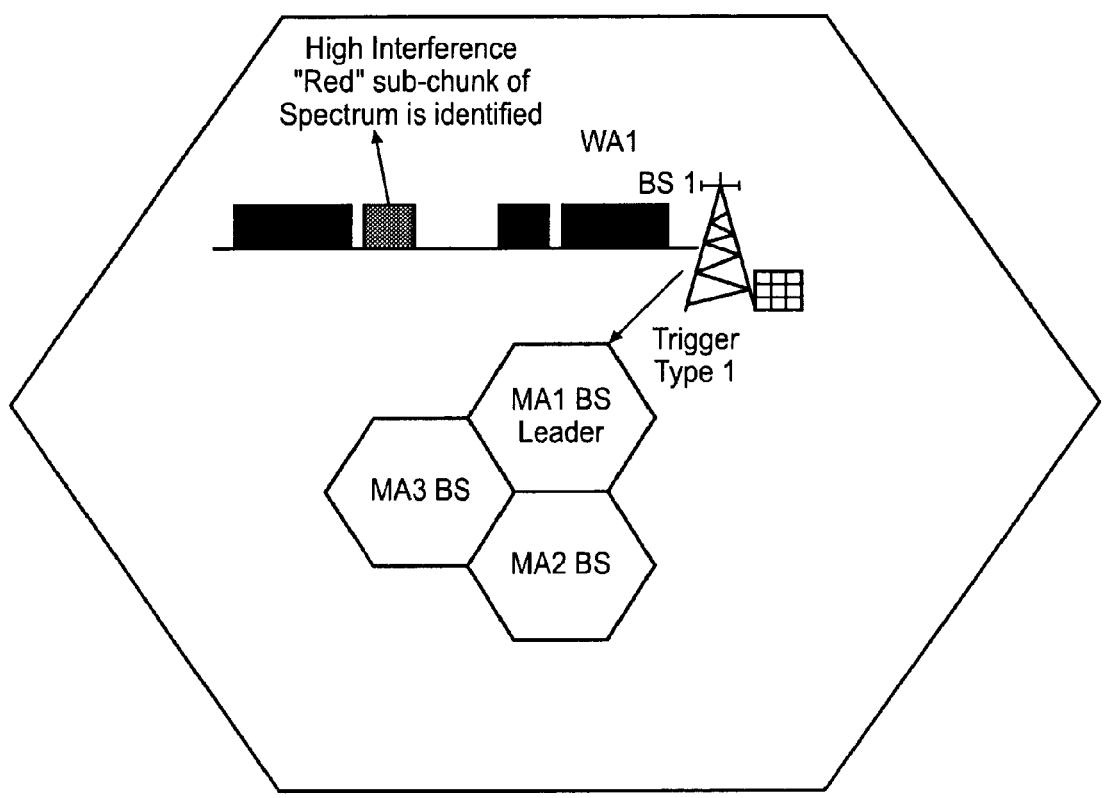
FIG. 1 illustrates a wide-area base station sending a trigger for a spectrum exchange process, and includes a spectrum diagram indicating a high-interference sub-chunk of spectrum.
Figure 2:
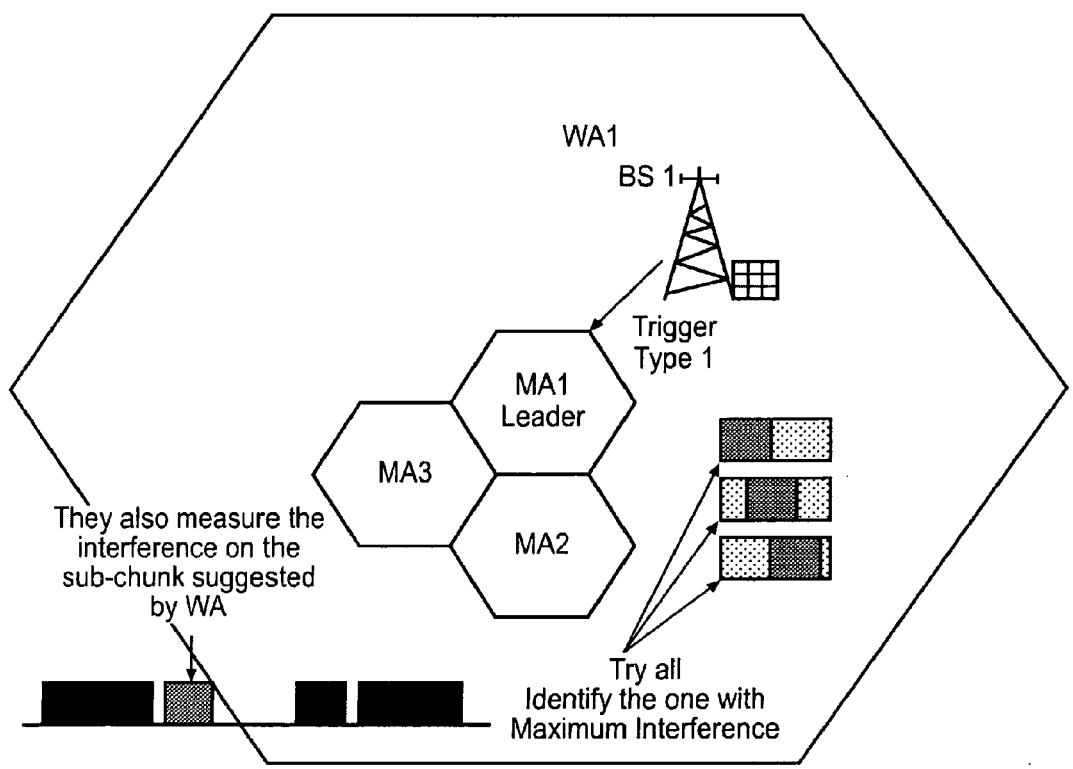
FIG. 2 illustrates base stations measuring interference in the sub-chunk of spectrum suggested by the wide-area base station.

In step 2, in response, the leader base station in cell MA1 asks all the MA base stations (in cells MA2 and MA3) to scan all the possible sub-chunks, again in the manner shown in the spectrum diagrams to the right-hand side of FIG. 2, to identify the one with the maximum interference level. It also asks them to scan the red sub-chunk suggested by the base station BS1 of cell WA1, which is indicated by the arrow in the spectrum diagram at the bottom-left corner of FIG. 2.

In step 3, the leader base station of cell MA1 itself also carries out the scan and identification process.

Figure 3:
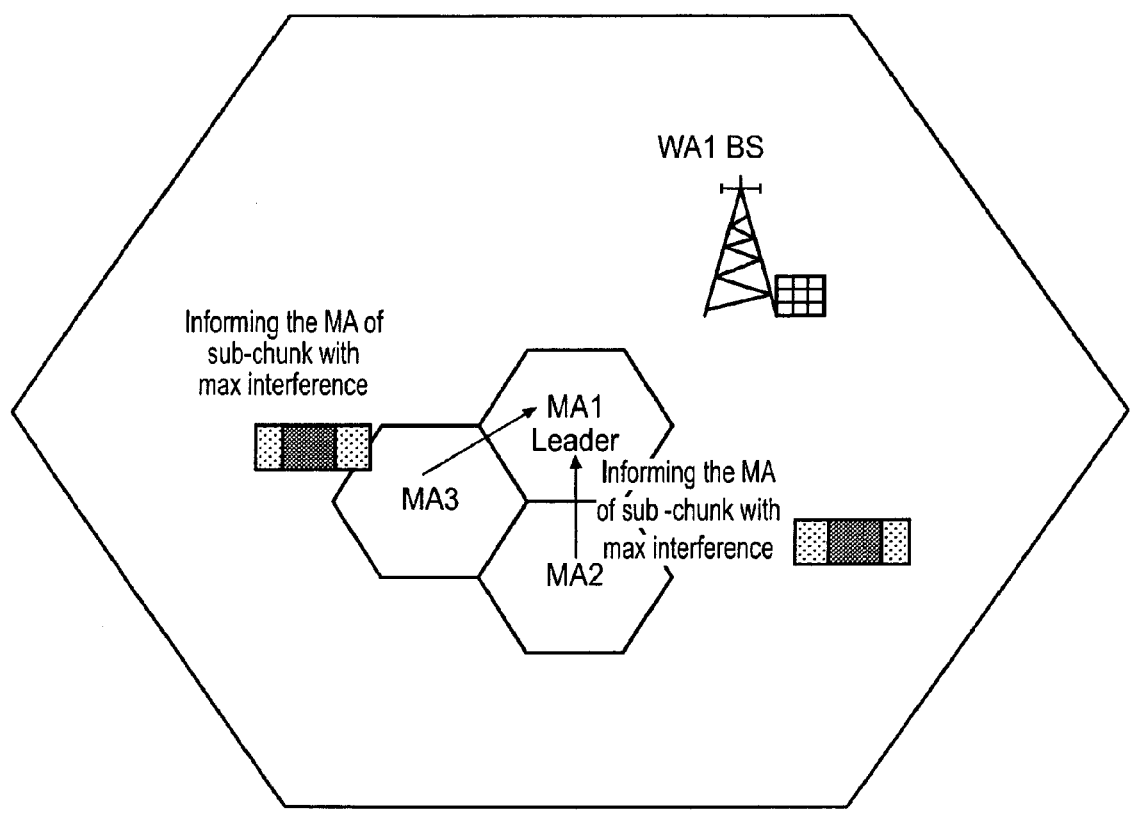
FIG. 3 illustrates base stations of the metropolitan-area network informing a leader base station of a sub-chunk with a maximum level of interference.

In step 4, the base stations of cells MA2 and MA3 inform the leader base station in cell MA1 of the sub-chunk they identified to have the maximum interference level, as shown in the spectrum diagrams in FIG. 3, in which the sub-chunk having the maximum interference level for each of cells MA2 and MA3 is shown in dark.

Figure 4:
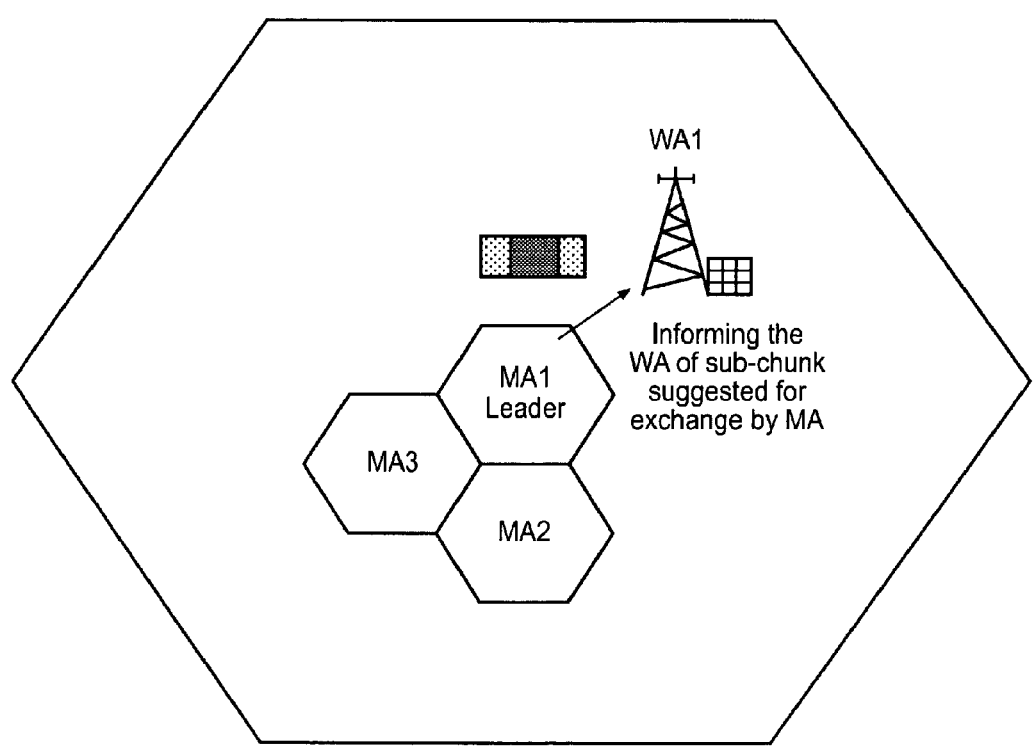
FIG. 4 illustrates the leader base station of the metropolitan-area network informing the wide-area base station of a suggested sub-chunk for exchange.

In step 5, if all the MA cells MA1-3 have identified the same sub-chunk with maximum interference (and the identified sub-chunk is different from the one suggested by the WA base station BS1) and if the interference they experience in this sub-chunk is below the interference of the red sub-chunk suggested by the WA base station BS1, the leader base station in cell MA1 informs the WA base station BS1 about the potential for exchange and availability of sub-chunk of spectrum selected by all the MA BS as shown in FIG. 4, in which the spectrum diagram indicates in dark the sub-chunk selected by the MA cells.

Figure 5:
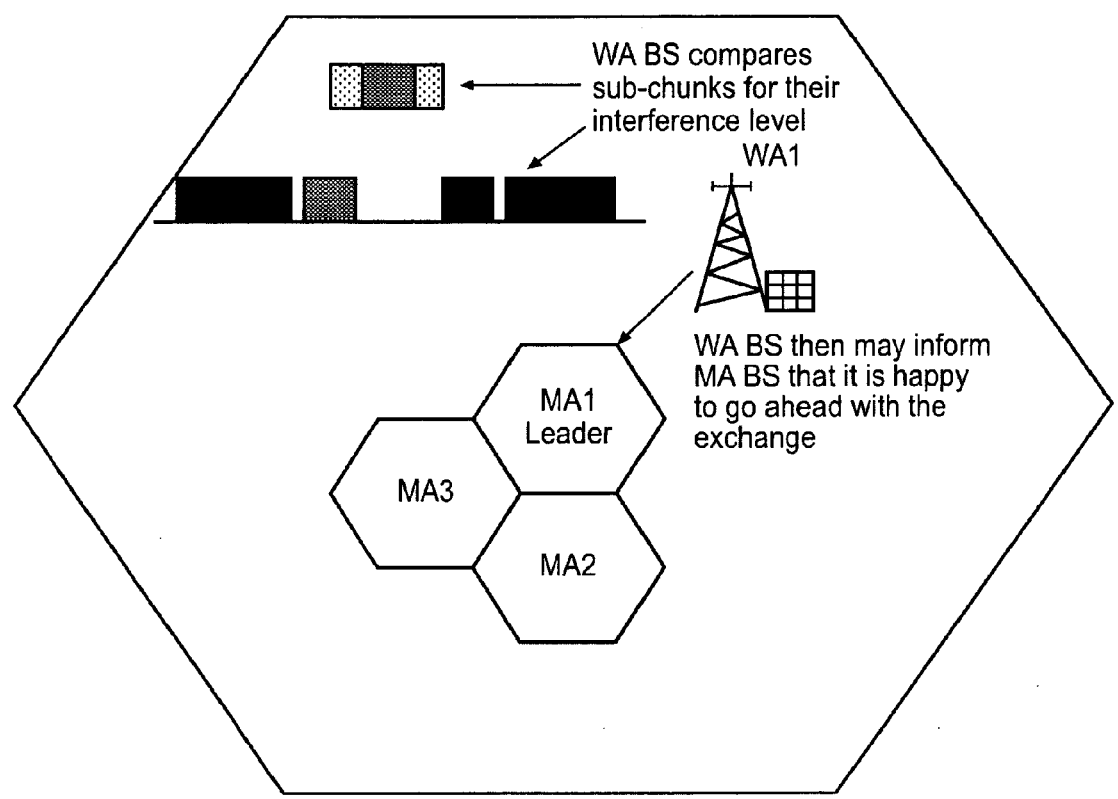
FIG. 5 illustrates the wide-area base station confirming the spectrum exchange, and includes a spectrum diagram illustrating a comparison of the interference in sub-chunks of spectrum.

In step 6, in response, the WA base station BS1 measures the interference at the sub-chunk of spectrum suggested by the cell MA1. If its interference is below the current troubled sub-chunk in the cell WA1, the WA base station BS1 informs the leader cell MA1 that it is happy to go ahead with the exchange, as shown in FIG. 5. The spectrum diagram at the top of FIG. 5 shows the WA base station BS1 comparing the interference levels in the sub-chunks.

Figure 6:
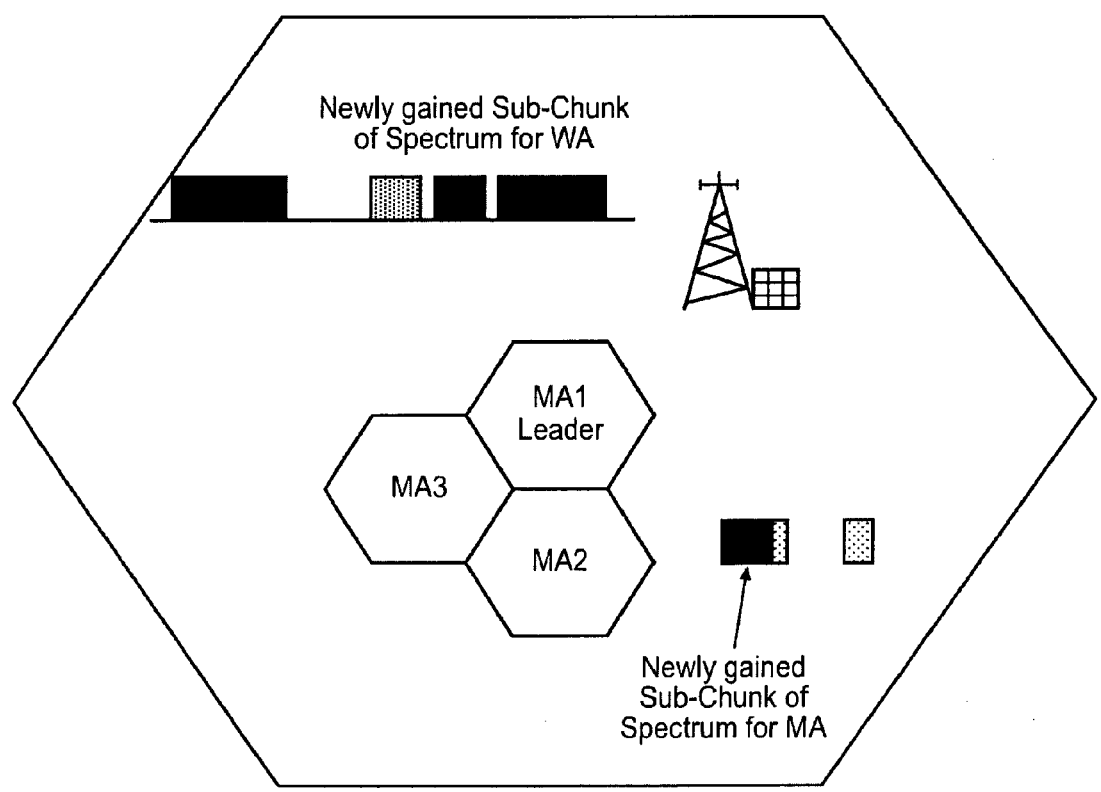
FIG. 6 illustrates spectrum configurations for the wide- and metropolitan-area networks following the spectrum exchange.

In step 7, the exchange takes place and part of the WA spectrum (i.e. the exchanged sub-chunk) is exchanged for part of the MA spectrum, as shown in FIG. 6. The lighter-coloured portion of spectrum in the spectrum diagram at the top of FIG. 6 has been gained by the WA base station BS1 from the MA cells, while the darker-coloured portion of spectrum in the spectrum diagram at the right-hand side of FIG. 6 has been gained by the MA cells from the WA base station BS1.

The figures, especially FIGS. 5 and 6, shows there to be a small degree of overlap between the portions of spectrum exchanged by the MA cells and the WA cell. As mentioned above, this is preferably not the case, but is allowable if the systems are located far enough away from each other such that interference from one system does not have a major impact on the other system.

Figure 7:
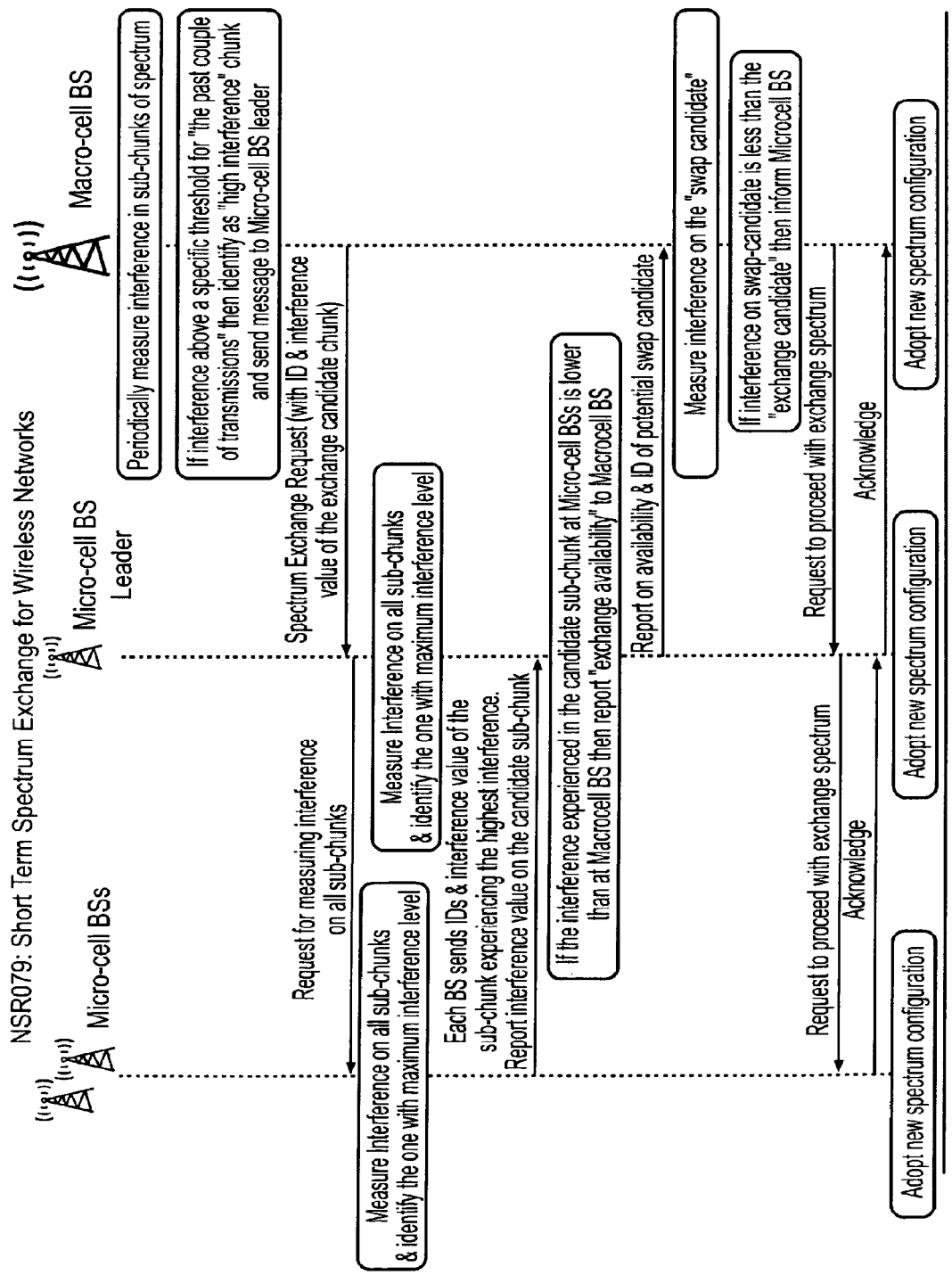
FIG. 7 shows a protocol for the spectrum exchange process.

FIG. 7 shows a protocol for the spectrum exchange process. A macro-cell base station (BS) (e.g. the WA base station BS1) periodically measures interference in sub-chunks of spectrum and, if the interference for a particular sub-chunk is above a specific threshold for the past couple of transmissions, the sub-chunk is identified as a high-interference sub-chunk. The macro-cell BS sends a message to a micro-cell BS leader (e.g. the base station of cell MA1), the message being a spectrum exchange request including the spectrum ID and the interference value of the exchange candidate sub-chunk (the high-interference sub-chunk). The micro-cell BS leader requests measurements of interference in all sub-chunks from the micro-cell BSs (the other micro-cell BSs). The micro-cell BSs measure interference in all sub-chunks and identify the one with the maximum interference level. At the same time, the micro-cell BS leader measures interference in all sub-chunks and identifies the one with the maximum interference level. Each micro-cell BS sends IDs and interference values of the sub-chunk experiencing the highest interference, and reports on the interference value in the exchange candidate sub-chunk, to the micro-cell BS leader. If the interference experienced in the exchange candidate sub-chunk at the micro-cell BSs is lower than at the macro-cell BS, the micro-cell BS leader reports the exchange availability to the macro-cell BS. The micro-cell BS leader also reports on the availability and ID of the potential swap candidate (the candidate sub-chunk referred to above). The macro-cell BS measures interference in the swap candidate. If the interference in the swap candidate is less than the exchange candidate sub-chunk, then the macro-cell BS informs the micro-cell BS leader by sending a request to proceed with the spectrum exchange to the micro-cell BS leader, which sends a similar request to the micro-cell BSs. The micro-cell BSs send acknowledgements to the micro-cell BS leader, which sends an acknowledgement to the macro-cell BS. Finally, each of the micro-cell BSs, the micro-cell BS leader and the macro-cell BS adopts the new spectrum configuration.

The following disclosure relates to a performance evaluation and simulation results. For the purposes of the simulation, it is assumed that three MA BSs are present within a WA cell. The bit error rate (BER) requirements selected for simulations is $10^{-3}$, and it is assumed that a Reed-Muller channel code RM(1,m) is used. Adaptive channel coding rates for a data packet and radio node have been considered to enable the radio nodes to adjust their transmission rates and consequently the target SIR values. The presented SIR results in Table 1 can be employed to obtain the equivalent throughput results.

TABLE 1

Code Rates of Reed-Muller Code RM (1, m) and Corresponding SIR Requirements for Target BER

| m | Code Rate | SIR (dB) |
| --- | --- | --- |
| 2 | 0.75 | 6 |
| 3 | 0.5 | 5.15 |
| 4 | 0.3125 | 4.6 |
| 5 | 0.1875 | 4.1 |
| 6 | 0.1094 | 3.75 |
| 7 | 0.0625 | 3.45 |
| 8 | 0.0352 | 3.2 |
| 9 | 0.0195 | 3.1 |
| 10 | 0.0107 | 2.8 |

Figure 8A:
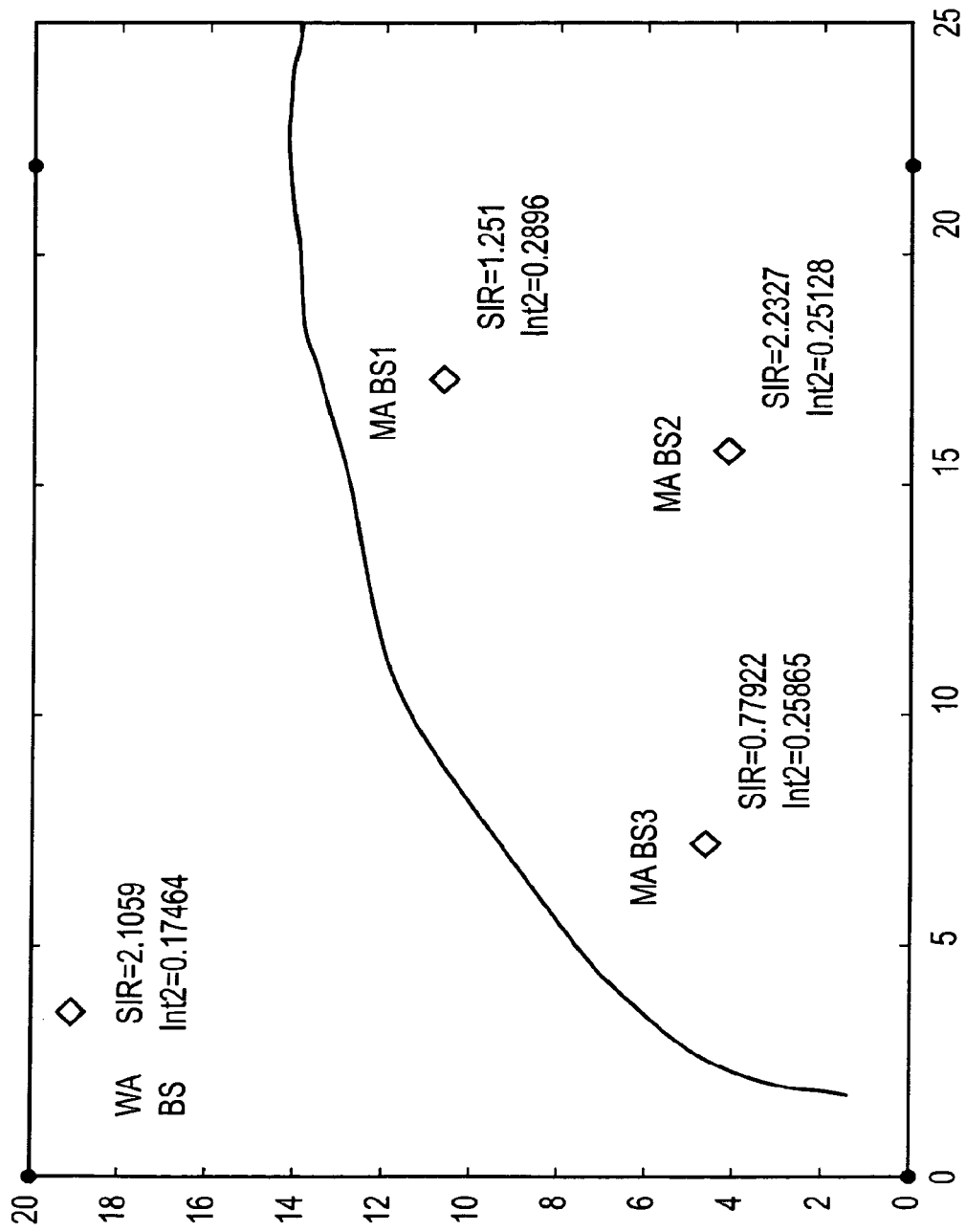
FIG. 8A shows the result of a simulation of the impact of the spectrum exchange process on a level of interference, immediately before the exchange of spectrum.
Figure 8B:
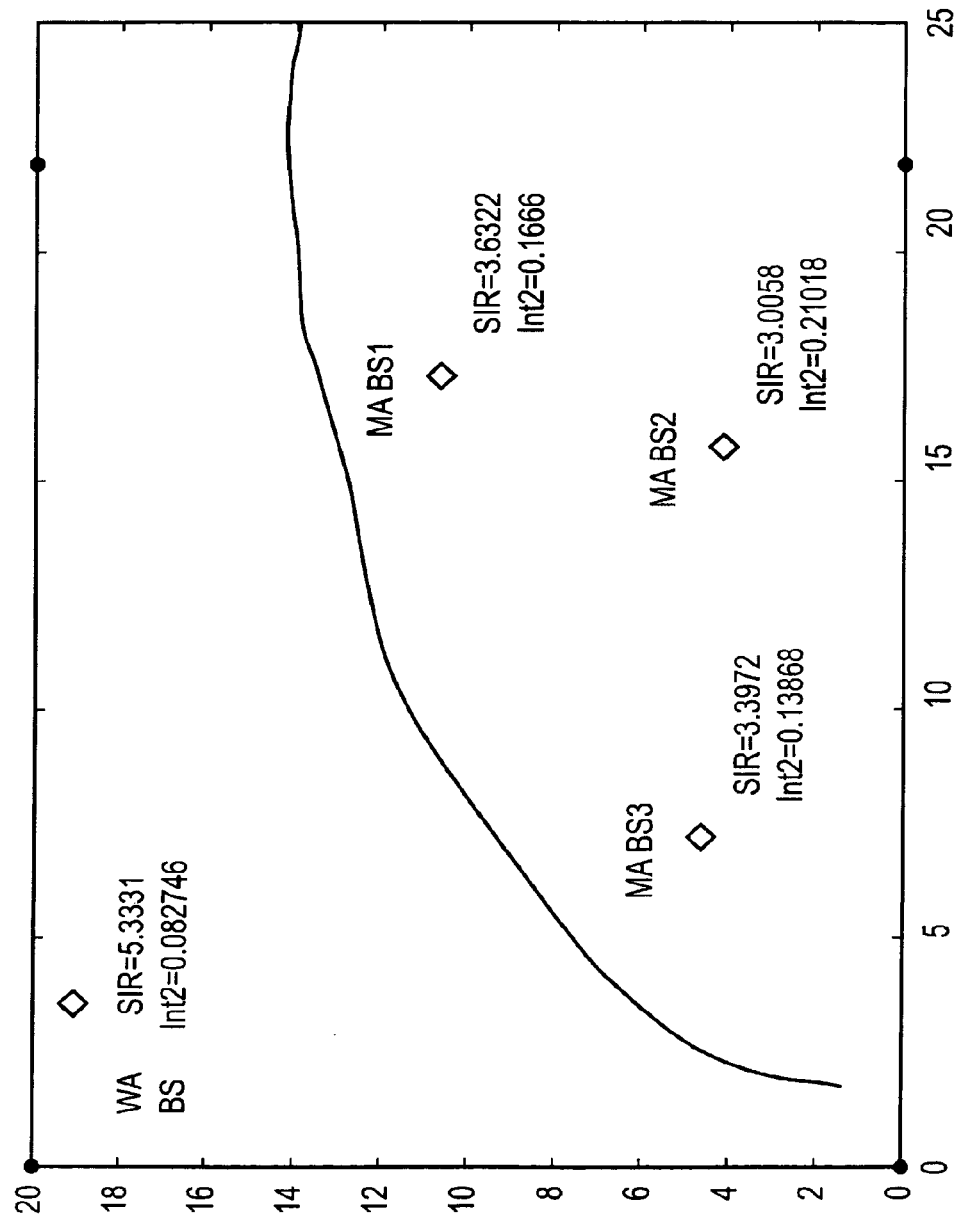
FIG. 8B shows the result of a simulation of the impact of the spectrum exchange process on a level of interference, after completion of the spectrum exchange process.

FIG. 8A shows the result of a simulation of the impact of the spectrum exchange process on a level of interference, immediately before the exchange of spectrum, while FIG. 8B shows the result of a simulation of the impact of the spectrum exchange process on a level of interference, after completion of the spectrum exchange process. It can be seen that, after a successful negotiation between the leader MA base station of the WA base station, the interference was reduced.

Figure 9:
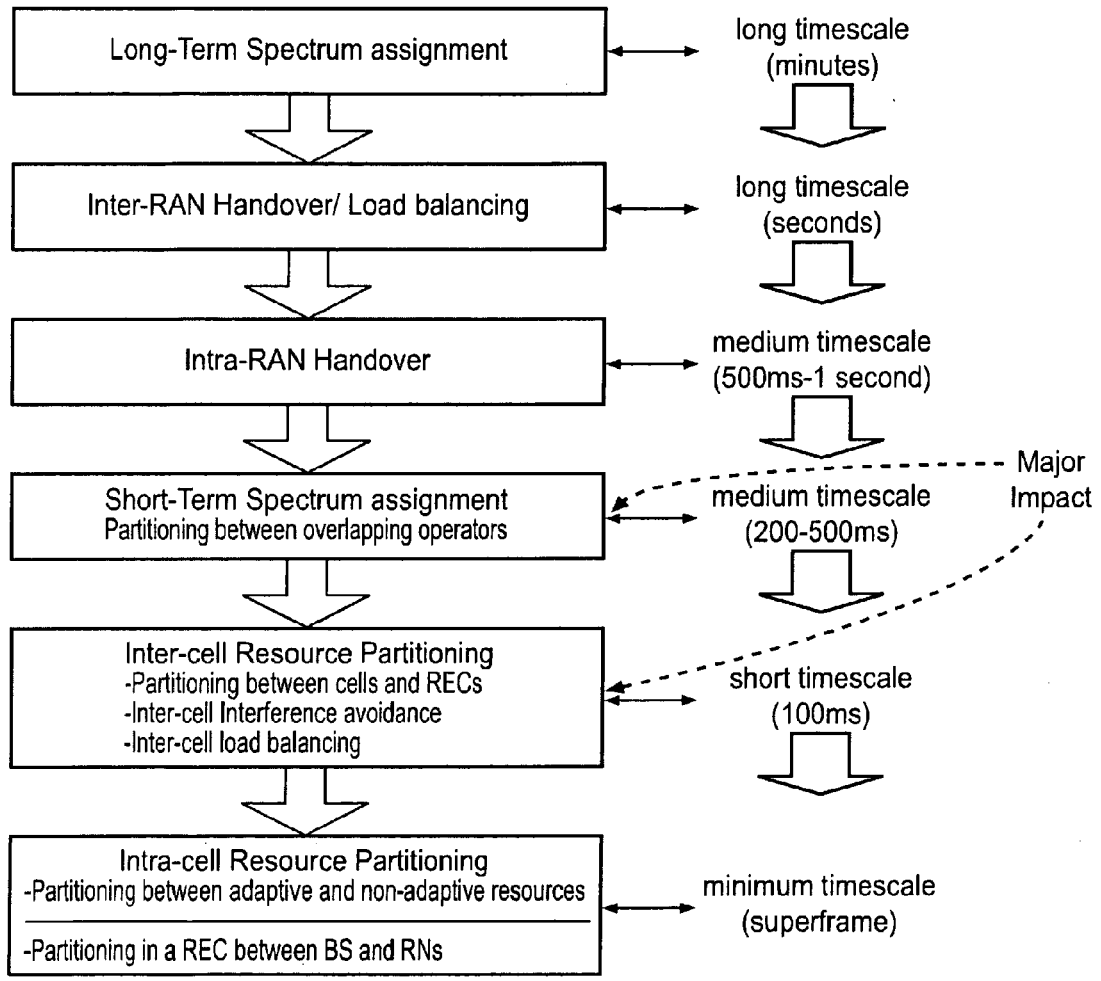
FIG. 9 shows the impact of the invention on the stages of spectrum assignment.

FIG. 9 shows the impact of the invention on the stages of spectrum assignment, the major impact being on short-term spectrum assignment and on inter-cell resource partitioning.

It will be appreciated that the aforementioned circuitry may have other functions in addition to the mentioned functions, and that these functions may be performed by the same circuit.

Although embodiments of the invention have been described with reference to a hierarchical overlaid cellular network, it will be appreciated that the invention is applicable to other networks, including non-hierarchical, non-overlaid networks.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of controlling spectrum use in at least a first and a second wireless communication system which are operable to take part in a spectrum exchange process, the method comprising:
measuring, in the first wireless communication system, interference in different portions of spectrum,
if interference in the first wireless communication system for a certain portion of spectrum is above a threshold, identifying that portion as an exchange candidate portion and sending a spectrum exchange request to the second wireless communication system, the spectrum exchange request including a spectrum ID and an interference value associated with the exchange candidate portion,
measuring, in the second wireless communication system, interference in different portions of spectrum and identifying a portion with a maximum interference as a swap candidate portion,
if the interference in the second wireless communication system for the exchange candidate portion is less than the interference in the first wireless communication system for the exchange candidate portion, reporting exchange availability to the first wireless communication system, the reporting of exchange availability including reporting a spectrum ID of the swap candidate portion,
measuring, in the first wireless communication system, interference in the swap candidate portion,
if the interference in the first wireless communication system for the swap candidate portion is less than the interference in the first wireless communication system for the exchange candidate portion, sending a request to the second wireless communication system for spectrum exchange, and adopting a new spectrum configuration in the first and second wireless communication systems wherein the exchange candidate portion is available for use by the second wireless communication system and the swap candidate portion is available for use by the first wireless communication system.

2. The method as claimed in claim 1, wherein the first wireless communication system comprises a wide-area network and the second wireless communication system comprises one or more cells of a metropolitan-area network within the wide-area network.

3. The method as claimed in claim 2, wherein the second wireless communication system comprises a plurality of cells of a metropolitan-area network within the wide-area network.

4. The method as claimed in claim 2, wherein the wide-area network, and each metropolitan-area network cell, includes a base station, and the base station of one metropolitan-area network cell acts as a leader for all of the metropolitan-area networks cells.

5. The method as claimed in claim 4, wherein the sending of the spectrum exchange request to the second wireless communication system comprises the base station of the wide-area network sending said request to the leader base station.

6. The method as claimed in claim 4, wherein, in the measuring of interference in different portions of spectrum in the second wireless communication system, the leader base station requests measurement of interference in said different portions, by the base station in each metropolitan-area network cell, and identifies the swap candidate portion as the portion having the greatest interference measured by any of the metropolitan-area network cell base stations.

7. The method as claimed in claim 4, wherein, in the measuring of interference in different portions of spectrum in the second wireless communication system, the leader base station requests measurement of interference in said different portions, by the base station in each metropolitan-area network cell, and if all of the metropolitan-area network cell base stations identify the same portion as having the maximum interference then the method comprises identifying that portion as the swap candidate portion, or if the metropolitan-area network cell base stations variously identify multiple different portions as having maximum interference then the method comprises determining a region of spectrum which has the greatest degree of overlap with all of said multiple different portions and selecting the region as the swap candidate portion.

8. The method as claimed in claim 1, comprising controlling one or both of the exchange candidate portion and the swap candidate portion to substantially equalize operational parameters of the first wireless communication system with equivalent operational parameters of the second wireless communication system.

9. The method as claimed in claim 1, comprising comparing the exchange candidate portion and the swap candidate portion, and proceeding with the exchange only if the exchange candidate portion is different to the swap candidate portion.

10. The method as claimed in claim 1, comprising selecting one or both of the exchange candidate portion and the swap candidate portion to reduce the number of separate, continuous regions of spectrum used by at least one of the wireless communication systems.

11. The method as claimed in claim 1, comprising, after spectrum exchange, avoiding use by the first wireless communication system of the exchange candidate portion.

12. Apparatus comprising circuitry operable to control spectrum use in at least a first and a second wireless communication system which are operable to take part in a spectrum exchange process, the circuitry operable to:
measure, in the first wireless communication system, interference in different portions of spectrum,
if interference in the first wireless communication system for a certain portion of spectrum is above a threshold, identify that portion as an exchange candidate portion and send a spectrum exchange request to the second wireless communication system, the spectrum exchange request including a spectrum ID and an interference value associated with the exchange candidate portion,
measure, in the second wireless communication system, interference in different portions of spectrum and identify a portion with a maximum interference as a swap candidate portion,
if the interference in the second wireless communication system for the exchange candidate portion is less than the interference in the first wireless communication system for the exchange candidate portion, report exchange availability to the first wireless communication system, the reporting of exchange availability including reporting a spectrum ID of the swap candidate portion, measure, in the first wireless communication system, interference in the swap candidate portion, if the interference in the first wireless communication system for the swap candidate portion is less than the interference in the first wireless communication system for the exchange candidate portion, send a request to the second wireless communication system for spectrum exchange, and adopt a new spectrum configuration in the first and second wireless communication systems wherein the exchange candidate portion is available for use by the second wireless communication system and the swap candidate portion is available for use by the first wireless communication system.

13. A computer program product comprising a non-transitory computer readable storage medium and computer program instructions, recorded on the non-transitory computer readable storage medium, which, when run on a computer comprising a processor and a memory storing the computer program instructions, causes the computer to perform a method of controlling spectrum use in at least a first and a second wireless communication system which are operable to take part in a spectrum exchange process, the method comprising:

measuring, in the first wireless communication system, interference in different portions of spectrum, if interference in the first wireless communication system for a certain portion of spectrum is above a threshold, identifying that portion as an exchange candidate portion and sending a spectrum exchange request to the second wireless communication system, the spectrum exchange request including a spectrum ID and an interference value associated with the exchange candidate portion, measuring, in the second wireless communication system, interference in different portions of spectrum and identifying a portion with a maximum interference as a swap candidate portion, if the interference in the second wireless communication system for the exchange candidate portion is less than the interference in the first wireless communication system for the exchange candidate portion, reporting exchange availability to the first wireless communication system, the reporting of exchange availability including reporting a spectrum ID of the swap candidate portion, measuring, in the first wireless communication system, interference in the swap candidate portion, if the interference in the first wireless communication system for the swap candidate portion is less than the interference in the first wireless communication system for the exchange candidate portion, sending a request to the second wireless communication system for spectrum exchange, and adopting a new spectrum configuration in the first and second wireless communication systems wherein the exchange candidate portion is available for use by the second wireless communication system and the swap candidate portion is available for use by the first wireless communication system.

* * * * *